(12) United States Patent
Wu

(10) Patent No.: US 9,855,607 B2
(45) Date of Patent: Jan. 2, 2018

(54) LATHE AND CLAMPING ASSEMBLY THEREOF

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Xiao-Yi Wu, Jiashan (CN)

(73) Assignee: FUXIANG PRECISION INDUSTRIAL (KUNSHAN) CO., LTD., Kunshan (CN)

( * ) Notice: Subject to any disclaimer, the term of this patent is extended or adjusted under 35 U.S.C. 154(b) by 656 days.

(21) Appl. No.: 14/488,842

(22) Filed: Sep. 17, 2014

(65) Prior Publication Data
US 2015/0082952 A1 Mar. 26, 2015

(30) Foreign Application Priority Data
Sep. 24, 2013 (CN) .................. 2013 2 05889287 U

(51) Int. Cl.
*B23B 5/14* (2006.01)
*B23B 31/177* (2006.01)
*B23B 13/12* (2006.01)

(52) U.S. Cl.
CPC .............. *B23B 5/14* (2013.01); *B23B 13/123* (2013.01); *B23B 31/16258* (2013.01); *B23B 2270/027* (2013.01); *Y10T 82/16* (2015.01); *Y10T 279/1224* (2015.01)

(58) Field of Classification Search
CPC .......... B23B 31/162; B23B 31/162254; B23B 31/16237; B23B 31/16287; B23B 31/1223
See application file for complete search history.

(56) References Cited

U.S. PATENT DOCUMENTS

| | | | | |
|---|---|---|---|---|
| 1,441,088 A | * | 1/1923 | Hofstetter | B23B 31/1622 137/594 |
| 1,869,445 A | * | 8/1932 | Tomkins | B23B 31/1622 269/128 |
| 2,455,663 A | * | 12/1948 | Eaton | B23B 31/162 279/118 |
| 2,704,214 A | * | 3/1955 | Beausoleil | B23B 31/16237 279/121 |

(Continued)

*Primary Examiner* — Will Fridie, Jr.
(74) *Attorney, Agent, or Firm* — ScienBiziP, P.C.

(57) ABSTRACT

A lathe includes a main shaft, a moving shaft, a cutter mounted on the moving shaft, and a clamping assembly. The cutter is capable of telescopic translation relative the moving shaft. The clamping assembly includes a cylinder mounted on the cutter, an assembly member mounted on the cylinder, a moving member, and at least two clamping members. The cylinder defines an inner cavity, and a first air intake and a second air intake communicated to the inner cavity. The moving member is movably mounted in the inner cavity and partially received in the assembly member, and capable of telescopic translation relative the assembly member. The clamping members are movably mounted on the assembly member and engaged with the moving member. The clamping members are translatably urged by the moving member in a direction relative the axis defined by the assembly member.

16 Claims, 4 Drawing Sheets

(56) References Cited

U.S. PATENT DOCUMENTS

| | | | | |
|---|---|---|---|---|
| 3,199,880 A | * | 8/1965 | Blattry | B23B 31/1625 |
| | | | | 279/121 |
| 3,369,464 A | * | 2/1968 | Blattry | B23B 31/302 |
| | | | | 137/102 |
| 3,370,859 A | * | 2/1968 | Benjamin | B23B 31/14 |
| | | | | 279/119 |
| 3,814,449 A | * | 6/1974 | Buck | B23B 31/1223 |
| | | | | 279/127 |
| 3,871,670 A | * | 3/1975 | Wright | B23B 31/1215 |
| | | | | 279/123 |
| 4,505,636 A | * | 3/1985 | Sugino | B25J 15/0052 |
| | | | | 294/86.4 |
| 6,089,577 A | * | 7/2000 | Takada | B23B 31/16254 |
| | | | | 279/121 |

* cited by examiner

LATHE AND CLAMPING ASSEMBLY THEREOF

FIELD

The present disclosure relates generally to a lathe and a clamping assembly of the lathe.

BACKGROUND

A conventional lathe used to cut off rod-like workpieces includes a main shaft, a moving shaft, and a cutter mounted on the moving shaft. In operation, the cutter moves to the workpiece with the moving shaft and cuts off the workpiece. The workpiece is pulled out by manual.

BRIEF DESCRIPTION OF THE DRAWINGS

Implementations of the present technology will now be described, by way of example only, with reference to the attached figures.

DETAILED DESCRIPTION

Figure 1:
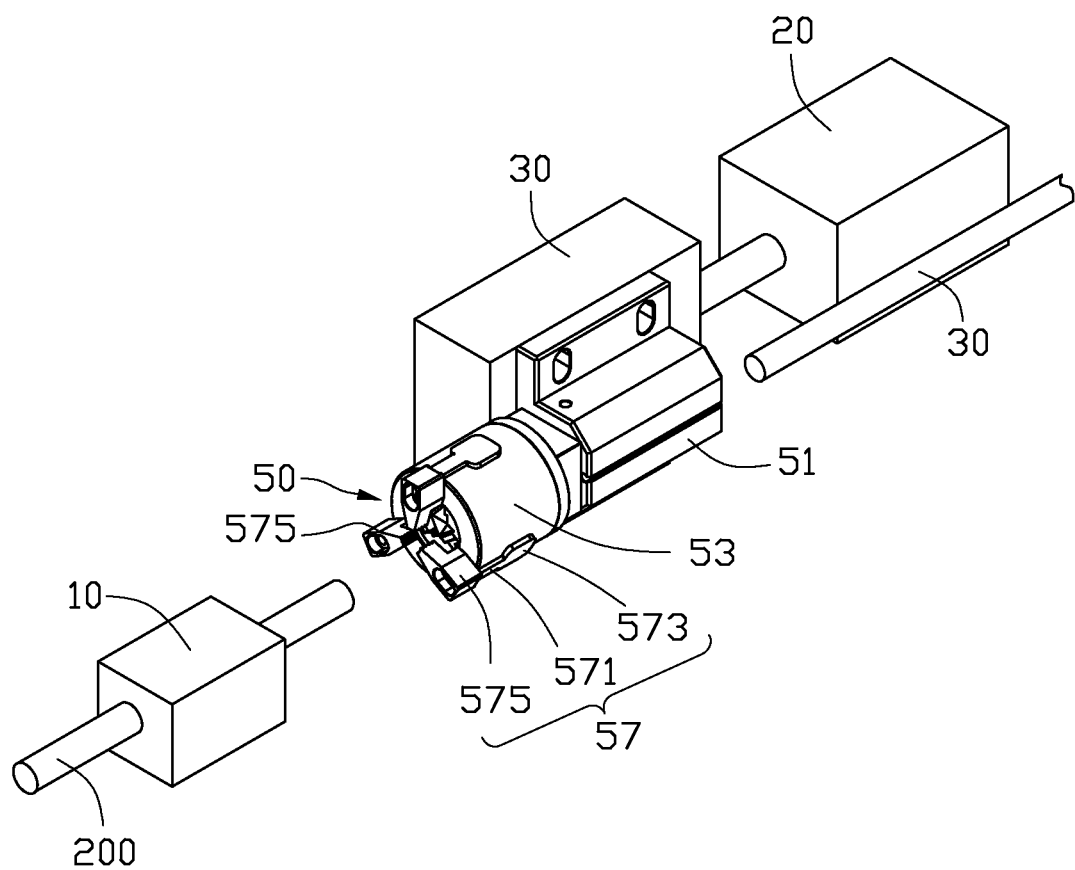
FIG. 1 is an exploded, isometric view of one embodiment of a lathe.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a lathe and a clamping assembly of the lathe.

FIG. 1 illustrates a lathe 100 including a main shaft 10, a moving shaft 20, a cutter 30, and a clamping assembly 50. The main shaft 10 can be used to clamp a workpiece 200. The moving shaft 20 can be positioned opposite to the main shaft 10 and move relative to the main shaft 10. The cutter 30 can be mounted on the moving shaft and capable of telescopic translation relative the moving shaft 20. The clamping assembly 50 can be mounted on one side of the cutter 30 and coupled to an external gas source 300 mounted on the moving shaft 20. The clamping assembly 50 can clamp the workpiece 200 under air pressure transported by the external gas source 300, and pull out the workpiece 200 from the main shaft 10 with the movement of the moving shaft 20. In at least one embodiment, the workpiece 200 can be substantially rod-like.

The clamping assembly 50 can include a cylinder 51, an assembly member 53, and three clamping members 57. The cylinder 51 can be mounted on one side of the cutter 30. The assembly member 53 can be hollow and substantially column shaped, and mounted on one side of the cylinder 51. The three clamping members 57 can be movably mounted on the assembly member 53. Each clamping member 57 can include a positioning portion 571, a clasp portion 573, and a clamping portion 575.

Figure 2:
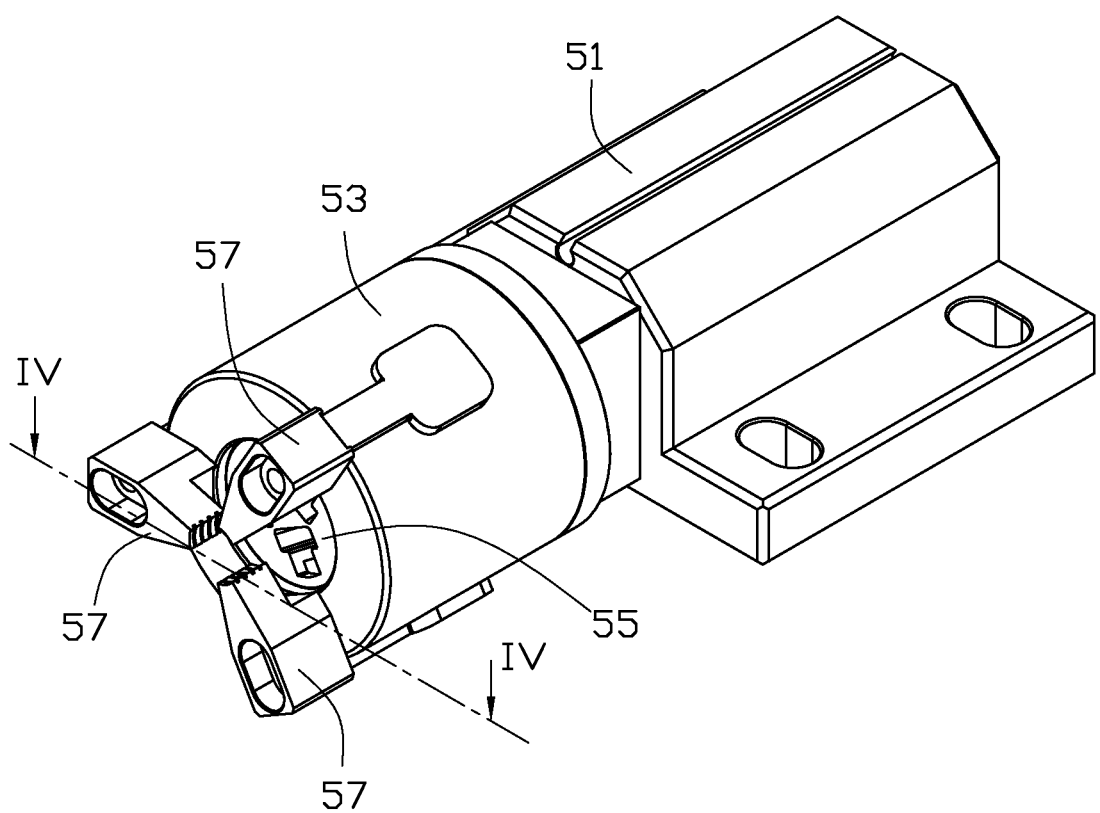
FIG. 2 is an isometric view of clamping assembly of a lathe in FIG. 1.

FIG. 2 illustrates that the clamping assembly 50 can further include a moving member 55.

Figure 3:
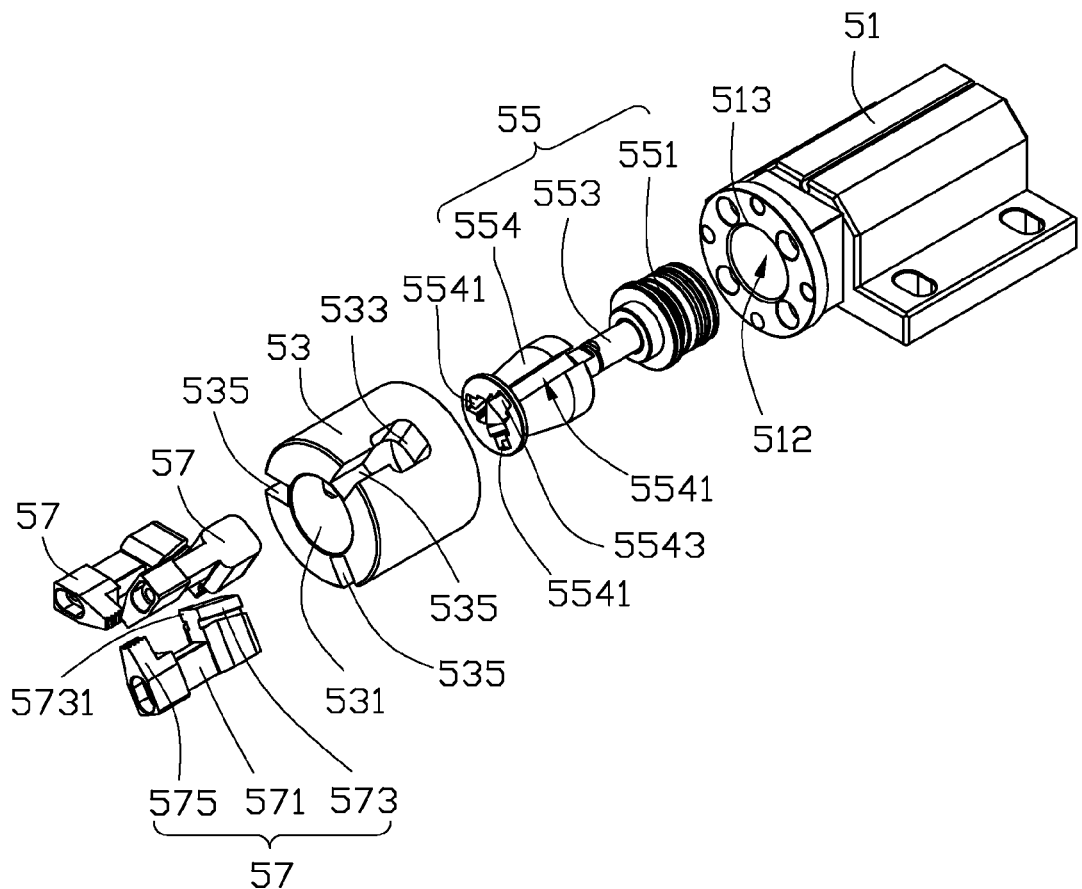
FIG. 3 is an exploded, isometric view of the clamping assembly of FIG. 2.

FIG. 3 illustrates the exploded view of the clamping assembly 50. The cylinder 51 can define an inner cavity 512, and an opening 513 in fluid communication with the inner cavity 512 at one end thereof.

The assembly member 53 can be mounted on one end of the cylinder 51 near the opening 513, and define a through hole 531 communicated to the opening 513. An outer periphery of the assembly member 53 can define three guide holes 533 distanced from each other and communicated to the through hole 531. One end of the assembly member 53 away from the cylinder 51 can define three receive grooves 535 corresponding to the three guide holes 533. Each receive groove 535 can be communicated to the corresponding guide hole 533.

The moving member 55 can be movably positioned in the inner cavity 512 of the cylinder 51, and partially received in the through hole 531 of the assembly member 53. The moving member 55 can include a piston 551, a piston shaft 553, and a pushing portion 554. The piston 551 and the pushing portion 554 can be connected to two ends of the piston shaft 553. The pushing portion 554 can be substantially circular table shaped, and an outer periphery of the pushing portion 554 can define three slide grooves 5541 corresponding to the three guide holes 533. Each of the slide grooves 5541 can include an inclined surface 5543 at the bottom.

The clasp portion 573 and the clamping portion 575 can be positioned at two ends of the positioning portion 571, and extend along a same direction. The positioning portion 571 can be received in the receive groove 535. The clasp portion 573 can pass through the guide hole 533 and slidably latched into the slide groove 5541, thus the clasp portion 573 can slide along the slide groove 5541. The clasp portion 573 can include a resisting surface 5731 mate with the inclined surface 5543. The three clamping members 57 can be movably mounted on the assembly member 53, and engaged to the corresponding slide grooves 5541.

Figure 4:
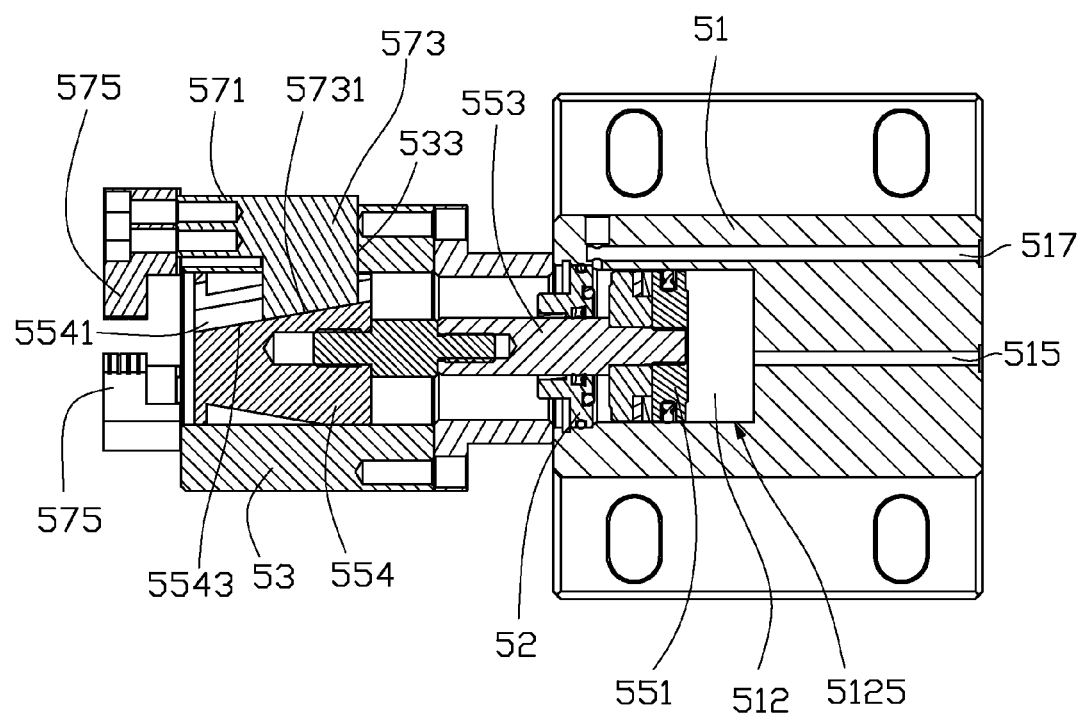
FIG. 4 is a cross-sectional view of the clamping assembly taken along the line IV-IV of FIG. 2.

FIG. 4 illustrates that the cylinder 51 can define a first air intake 515 and a second air intake 517. The first air intake 515 and the second air intake 517 can be in fluid communication with the inner cavity 512 and communicated to the external gas source 300 (shown in FIG. 1).

The piston 551 can be received in the inner cavity 512 and resist against an inner surface 5125 of the inner cavity 512, and the inner cavity 512 can be separated to a first air inlet portion 5121 and a second air inlet portion 5123 by the piston 551. The first air inlet portion 5121 can be communicated to the first air intake 515, and the second air inlet portion 5123 can be communicated to the second air intake 517. When external gas source 300 transports gas to the first air inlet portion 5121 through the first air intake 515, the piston 551 can move forward along the inner surface 5125 of the inner cavity 512. When the external gas source 300 transports gas to the second air inlet portion 5123 through the second air intake 517, the piston 551 can move backward along the inner surface 5125 of the inner cavity 512.

The clamping assembly 50 can further include a sealing member 52 mounted in the cylinder 51. One end of the piston 553 can be connected to the piston 551, and the other end can pass through the sealing member 52 and partially received in the through hole 531 of the assembly member 53.

When the external gas source 300 supplies gas to the first air inlet portion 5121, the piston 551 can move forward along the inner surface 5125 of the inner cavity 512, and the inclined surface 5543 can push the resist surface 5731, whereby the three clamping members 57 can move away from an axis defined by the assembly member 53 to release the workpiece 200. When the external gas source 300 supplies gas to the second air inlet portion 5123 through the second air intake 5123, the piston 551 can move backward along the inner surface 5125 of the inner cavity 512, and the three clamping members 57 can move toward the axis of the assembly member 53 to clamp the workpiece 200. The three clamping members 57 can be translatably urged by the moving member 55 in a direction relative to the axis of the assembly member 53.

In operation, the cutter 30 can move to and cut off the workpiece 200. Then the cutter 30 can stretch out and rotate relative to the moving shaft 20, and the clamping assembly 50 can align to the workpiece 200. The cutter 30 can then draw back to reset and the cylinder 51 of the clamping assembly 50 can be communicated to the external gas source 300. The clamping assembly 50 can move to the workpiece 200 driven by the moving shaft 20, and the workpiece 200 can be partially received in the clamping portions 575 of the three clamping members 57. The main shaft 10 can release the workpiece 200, and the external gas source 300 can supply gas to the second air inlet portion 5123 through the second air intake 517, such that the piston 551 can move backward along the cavity 512, and the three clamping members 57 can move toward the axis of the moving member 55 to clamp the workpiece 200. Then, the moving shaft 20 can move away from the main shaft 10, such that the three clamping members 57 can pull out the workpiece 200.

After that, the main shaft 10 can tightly clamp the workpiece 200, and the external gas source 300 can supply gas to the first air inlet portion 5121 through the first air intake 515, such that the piston 551 can move forward along the cavity 512, and the inclined surface 5543 of the pushing portion 554 can push the resist surface 5731. The three clamping members 57 can move away from the axis of the moving member 55 to release the workpiece 200.

Then, the cutter 30 can stretch out relative to the moving shaft 20, and the cylinder 51 can move away from the external gas source 300. The cutter 30 can rotate relative to the moving shaft 20 to align to the workpiece 200, and cut off the workpiece 200 again with the movement of the moving shaft 20. Repeat the above process, until the workpiece 200 is cut to many parts.

The lathe 100 of this disclosure can include the clamping assembly 50, the clamping assembly 50 can include the moving member 55 and three clamping members 57 slidably coupled to the moving member 55. The moving member 55 can push the three clamping members 57 to move toward or away from the axis of the assembly member 53, thus the workpiece 200 can be clamped or released. It is convenient to pull the workpiece 200.

As the cutter 30 can reach out relative to the moving shaft 20, the cylinder 51 can separate from the external gas source 300 when the cutter 30 rotating, and the transfer pipe (not shown) of the external gas source 300 would not wind on the cutter 30.

In other embodiments, the sealing member 52 can be omitted, and the cylinder 51 can define a through hole coupled to the piston shaft 553. The clamping members 57 can be two or more.

The embodiments shown and described above are only examples. Many details are often found in the art such as the other features of a lathe and a clamping assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A lathe comprising:
   a main shaft,
   a moving shaft capable of moving relative to the main shaft;
   a cutter mounted on the moving shaft and capable of telescopic translation relative the moving shaft; and
   a clamping assembly, the clamping assembly including:
      a cylinder mounted on the cutter, the cylinder having an inner cavity, and a first air intake and a second air intake, the first and second air intakes in fluid communication with the inner cavity;
      an assembly member defining an axis and mounted on one end of the cylinder;
      a moving member movably mounted in the inner cavity and at least partially received in the assembly member, and capable of telescopic translation relative the assembly member; and
      at least two clamping members movably mounted on the assembly member and engaged with the moving member, the at least two clamping members being translatably urged by the moving member in a direction relative the axis defined by the assembly member.

2. The lathe as claimed in claim 1, wherein the assembly member defines a through hole, and an outer periphery of the assembly member defines at least two guide holes distanced from each other and communicated to the through hole.

3. The lathe as claimed in claim 2, wherein the moving member comprises a pushing portion, and an outer periphery of the pushing portion defines at least two slide grooves corresponding to the at least two guide holes.

4. The lathe as claimed in claim 3, wherein each of the at least two clamping members comprises a clasp portion, and the clasp portions pass through the guide holes and slidably latched in the slide grooves.

5. The lathe as claimed in claim 4, wherein each of the slide grooves includes an inclined surface, and each of the clasp portions includes a resisting surface mate with the inclined surface.

6. The lathe as claimed in claim 4, wherein,
the moving member further comprises a piston and a piston shaft;
one end of the piston shaft movably passes through one end of the cylinder, and the piston is received in the inner cavity and resists against an inner surface of the inner cavity;
the pushing portion is capable of pushing the at least two clamping members when the piston doing telescopic movement relative to the inner cavity, and the at least two clamping members are capable of moving toward or away from the axis of the assembly member urged by the pushing portion.

7. The lathe as claimed in claim 6, wherein one end of the assembly member away from the cylinder defines at least two receive grooves toward the at least two guide holes, and the receive grooves are communicated to the corresponding guide holes.

8. The lathe as claimed in claim 7, wherein,
each of the clamping members further comprises a positioning portion and a clamping portion protruding from one end of the positioning portion;
the clasp portion is protruded from another end of the positioning portion;
the positioning portion is received in the receive groove, and the clamping portions of the at least two clamping members are positioned at one end of the assembly member away from the cylinder.

9. The lathe as claimed in claim 8, wherein the inner cavity is separated into a first air inlet portion and a second air inlet portion by the piston; the first air inlet portion is communicated to the first air intake, and the second air inlet portion is communicated to the second air intake.

10. A clamping assembly comprising:
a cylinder having an inner cavity, and a first air intake and a second air intake communicated to the inner cavity;
an assembly member mounted on one end of the cylinder;
a moving member comprising a piston and a piston shaft, the piston being received in the inner cavity and resisting against an inner surface of the inner cavity, one end of the piston shaft movably passing through one end of the cylinder and received in the inner cavity, the other end of the piston shaft being received in the assembly member, the moving member being capable of telescopic translation relative to the assembly member;
at least two clamping members movable mounted on the assembly member and engaged with the moving member, the at least two clamping members being translatably urged by the moving member in a direction relative the axis defined by the assembly member; and
wherein the inner cavity is separated into a first air inlet portion and a second air inlet portion by the piston; the first air inlet portion is in communication with the first air intake, and the second air inlet portion is in communication with the second air intake.

11. The clamping assembly as claimed in claim 10, wherein the assembly member defines a through hole to partially receive the other end of the piston shaft, and an outer periphery of the assembly member defines at least two guide holes distanced from each other and communicated to the through hole.

12. The clamping assembly as claimed in claim 11, wherein the moving member further comprises a pushing portion connected to the piston shaft, an outer periphery of the pushing portion defines at least two slide grooves corresponding to the at least two guide holes, the pushing portion is capable of pushing the at least two clamping members when the piston is in telescopic movement relative to the inner cavity, and the at least two clamping members are capable of moving toward or away from an axis of the assembly member urged by the pushing portion.

13. The clamping assembly as claimed in claim 12, wherein each of the at least two clamping members comprises a clasp portion, and the clasp portions pass through the guide holes and slidably latched in the slide grooves.

14. The clamping assembly as claimed in claim 13, wherein each of the slide grooves comprises an inclined surface, and each of the clasp portions includes a resisting surface mate with the inclined surface.

15. The clamping assembly as claimed in claim 13, wherein one end of the assembly member away from the cylinder defines at least two receive grooves toward the at least two guide holes, and the receive grooves are communicated to the corresponding guide holes.

16. The clamping assembly as claimed in claim 15, wherein,
each of the clamping members further comprises a positioning portion and a clamping portion protruding from one end of the positioning portion;
the clasp portion is protruded from another end of the positioning portion;
the positioning portion is received in the receive groove, and the clamping portions of the at least two clamping members are positioned at one end of the assembly member away from the cylinder.

* * * * *